(12) United States Patent
Wallenius et al.

(10) Patent No.: US 7,684,553 B2
(45) Date of Patent: Mar. 23, 2010

(54) METHOD FOR TRANSMITTING DATA IN A COMMUNICATION NETWORK

(75) Inventors: Jukka Wallenius, Helsinki (FI); Timo Vitikainen, Espoo (FI); Petri Vesikivi, Espoo (FI)

(73) Assignee: Nokia Corporation, Espoo (FI)

( * ) Notice: Subject to any disclaimer, the term of this patent is extended or adjusted under 35 U.S.C. 154(b) by 1910 days.

(21) Appl. No.: 10/471,975

(22) PCT Filed: Mar. 23, 2001

(86) PCT No.: PCT/EP01/03305

§ 371 (c)(1),
(2), (4) Date: Sep. 16, 2003

(87) PCT Pub. No.: WO02/078362

PCT Pub. Date: Oct. 3, 2002

(65) Prior Publication Data

US 2005/0259796 A1    Nov. 24, 2005

(51) Int. Cl.
*H04M 7/00* (2006.01)
(52) U.S. Cl. .................. 379/219; 379/220.01; 370/352; 370/354; 370/355; 370/356; 370/349
(58) Field of Classification Search .................. 379/219, 379/220.01; 370/352, 354, 355, 356, 349
See application file for complete search history.

(56) References Cited

U.S. PATENT DOCUMENTS 5,901,284 A * 5/1999 Hamdy-Swink ................ 726/5

(Continued)

FOREIGN PATENT DOCUMENTS

WO          99/01961         1/1999
WO          99/40732         8/1999

(Continued)

OTHER PUBLICATIONS

3GPP TS 23.140 v4.1.0; $3^{rd}$ Generation Partnership Project; Technical Specification Group Terminals; Multimedia Messaging Service (MMS); Functional description; Stage 2 (Release 4), Dec. 2000.
3GPP TR 23.874 v1.3.0; $3^{rd}$ Generation Partnership Project; Technical Specification Group Services and System Aspects; Feasibility study of architecture for push service (Release 4), Nov. 2000.

*Primary Examiner*—Quynh H Nguyen
(74) *Attorney, Agent, or Firm*—Mintz, Levin, Cohn, Ferris, Glovsky, and Popeo, P.C.

(57) ABSTRACT

The present invention proposes a method for transmitting data in a communication network, said communication network comprising at least one call control entity (CSCF) for controlling calls to be established from a subscriber (A, B) to a communication destination (B, A), a service control entity (SCP) for controlling services provisioned in said network for a respective subscriber, and a detection entity (DP) adapted to detect at least one of a plurality of predetermined conditions occurring in said network; said method comprising the steps of: forwarding a signaling message from said subscriber (A) to said at least one call control entity (CSCF) for being further forwarded to said destination (B), said signaling message comprising a message header and a message body, said message header including information descriptive for a content carried in the message body, detecting the occurrence of said at least one predetermined condition, and in case the occurrence of said predetermined condition has been detected, sending information concerning the content carried in the message body of said signaling message to said service control entity (SCP). Also, the present invention proposes a communication system comprising a call control entity (CSCF) controlling calls to be established from a subscriber (A, B) to a communication destination (B, A), a service control entity (SCP) controlling services provisioned in a network for a respective subscriber, wherein said system is adapted to operate according to the above method, and also a call control entity and a service control entity as such.

23 Claims, 7 Drawing Sheets

U.S. PATENT DOCUMENTS 6,122,372 A * 9/2000 Hughes .......................... 380/2
6,363,424 B1 * 3/2002 Douglas et al. ............. 709/224
6,421,674 B1 * 7/2002 Yoakum et al. ............... 707/10
6,625,141 B1 * 9/2003 Glitho et al. ................ 370/352

FOREIGN PATENT DOCUMENTS

| WO | 00/25535 | 5/2000 |
|---|---|---|
| WO | 00/65848 | 11/2000 |
| WO | 00/79756 | 12/2000 |
| WO | WO 01/19093 A1 | 3/2001 |

* cited by examiner

METHOD FOR TRANSMITTING DATA IN A COMMUNICATION NETWORK

FIELD OF THE INVENTION

The present invention relates to a method for transmitting data in a communication network.

BACKGROUND OF THE INVENTION

Recently, developments concerning communication networks focus also on a communication network enabling transmission of (speech) data on the basis of the Internet Protocol (IP), known as Voice over IP (VoIP) and/or IP Telephony.

Such communication networks comprise an access network via which a subscriber's terminal gains access and/or connects to a core network. The access network is specific to a connection technology such as wireless/radio access networks or non-wireless access networks, while the core network is independent of the connection technology adopted for connection of the terminal to the network.

FIG. 1 of the drawings shows in rough outline the basic constituents of such a communication network. It is to be noted that the drawing illustration has been significantly simplified for explanatory purposes such that FIG. 1 shows only those components considered to be relevant for the understanding of the present invention.

A subscriber, i.e. a subscriber's terminal A establishes a communication path via the network NW to a communication destination B. The subscriber's terminal may be any wireless or non-wireless terminal, as long as it is adapted to co-operate with the communication network NW. Likewise, the communication destination may be a terminal of a subscriber to said network. Nevertheless, it may be any terminal and also a terminal having subscribed to another network (not shown). A terminal may be identified by its address or an address associated thereto.

The communication network NW consists of an access network AN and a core network CN. Since the access network technology is of minor interest for the present invention, a detailed description thereof is omitted. However, the access network may for example be a UMTS (Universal Mobile Telecommunications System) access network, a GPRS (General Packet Radio Service) access network, or the like.

The core network CN in turn comprises at least one call control entity also referred to as call state control functional entity CSCF (or referred to as service switching point SSP). The call state control function CSCF comprises a serving CSCF and an interrogating CSCF. The serving CSCF is used for mobile originated communications and also to support mobile terminated communications. The serving CSCF provides a serving profile database SPD (not shown) and an address handling AH (also not shown) functionality. The serving CSCF supports the signaling interactions with a terminal. The interrogating CSCF is used for mobile terminated communications and is also used to determine how to route mobile terminated calls. The interrogating CSCF interrogates a home subscriber server HSS (not shown) for information to enable the call to be directed to the serving CSCF. The interrogating CSCF provides an incoming call gateway functionality ICGW and the address handling AH functionality. Both, the serving and interrogating CSCF components can be provided in a single CSCF if required.

Particularly, the call state control function CSCF provides a call control functionality CCF. In connection therewith, it provides among others for call set-up/termination and state/event management
call event reporting for billing, auditing, intercept or other purposes,
receiving and processing application level registrations.

Furthermore, the call state control functional entity CSCF has an interface to a service control entity also referred to as service control point SCP. This network entity provides for the ability of the network to determine what a particular service does, for a specific invocation of that service, within the limitations of that service.

Thus, in brief, a subscriber's terminal A, upon establishing a call, communicates via the access network, the CSCF of the core network, and again via the access network with the communication destination B (terminal of subscriber B, for example), while the services provided for such a call are under control of the SCP.

In currently developed communication networks, signaling within a network as described above is based on the Session Initiation Protocol SIP. According to the Session Initiation Protocol, SIP message headers are in plain text and look similar to e-mails. Also, SIP uses a client server model similar to the Hypertext transfer protocol HTTP and many others, and is used in conjunction with other protocols such as Session Description Protocol SDP etc.

Signaling is effected by exchanging SIP messages. SIP messages can be divided into SIP request messages and SIP response messages.

SIP request messages are SIP INVITE (invites client or server to establish a session), SIP ACK (confirmation reception of a final response to an INVITE message), SIP BYE (sender wishes to close the session), SIP CANCEL (cancels pending requests), SIP OPTIONS (asks for information about capabilities before establishing a session), SIP REGISTER (informs a location server of the client's IP address).

SIP response messages are 1xx Informational, 2xx Success, 3xx REDIRECTION, 4xx CLIENT ERROR, 5XX SERVER ERROR, 6XX GLOBAL FAILURE. Such SIP response messages use a 3 digit number, e.g. 1xx. The first digit defines the category, while the next two digits allow up to 100 variations, e.g. 200 OK (successful invitation).

The call state control functional entity CSCF in connection with the SIP serves as a SIP server with which session establishment is effected according to known SIP session establishment procedures which are not described here in detail. A SIP server similar to a CSCF is a so-called call processing server CPS (not shown in FIG. 1). The difference being that a CPS is compliant to SIP (as defined in RFC 2543), while the CSCF is compliant to 3GPP specifications. It can be said that a CSCF is a subclass of call processing servers designed for mobile networks.

The above briefly described SIP standards enable the sending of different types of content within the SIP signaling, for example with the SIP INVITE message. The content is defined with content type and content length field within the SIP message, whereas the actual content is inserted into the message body. Such content to be inserted can be any content which has a MIME type definition. MIME (=Multipurpose Internet Mail Extensions) provide a common structure for encoding a range of electronic documents or other multimedia data. For example, such MIME type content could be text, image, audio, video, compressed file, application data, HyperText Markup Language (HTML) data, e-mail data.

Using MIME enables signaling the type of "object" being carried, associating a file name with an object, associating several independent objects for forming a multi-part object, handling data encoded in text or binary and—if necessary—re-encoding the binary as text.

However, there may arise situations in which there are conditions prevailing in the network which impede the establishment of a call connection between a caller and a called destination (callee) and which will lead to missed calls.

In order to provide data representing information concerning missed calls to the callee, call answering services as a basic value added service in today's Public Land Mobile Networks (PLMNs) have been proposed. Such services are normally implemented using a voice mail system in connection with a call transfer function of the PLMN. In practice, a call answering service is often used for a mere recording of call/callback requests (by leaving a message such as "could you please call me back under telephone number 12345").

A call answering service is not an optimal service for call request logging although it is used for that purpose. The user (callee) must complete several phases before being able to call back the caller waiting for being called back. Namely, the callee will have to a) receive a notification (e.g. by SMS, Short Message Service) that a voice mail has arrived for his (mobile) terminal,
b) call his voice mail box,
c) listen to the voice mail and note down the telephone number he is asked to call back,
d) terminate the call to the voice mail box
e) make a new call to the phone number obtained under step c).

Missed calls are logged in today's mobile phones (terminals) but such a phone service cannot be used extensively because there exist limitations such as 1. mobile phones can not be always switched on (because of being present in or near airplanes/hospitals etc. where there might be a danger of adverse effects due to the radio waves emitted by the mobile terminal,
2. a caller is not informed that his failed call attempt has been logged in the called phone, which often means that the caller will additionally leave a voice message using the call answering service just requesting to be called back, and
3. it is difficult for the called person to derive a knowledge of who was the caller of the logged phone number (CLI, Calling Line Identity) if the logged CLI is not registered to the phonebook of his terminal (i.e. mobile phone).

Still further, with the use of SIP messages (as described above) such as SIP INVITE for call establishment, even in case of leaving a voice message at an answering service, content already carried in the SIP message is not known to the callee and would thus have to be retransmitted later on, leading to a wasteful use of network transmission capacity.

SUMMARY OF THE INVENTION

Consequently, it is an object of the present invention to provide an improved method for transmitting data in a communication network, which method is free from the above mentioned drawbacks.

According to the present invention, this object is for example achieved by method for transmitting data in a communication network, said communication network comprising at least one call control entity (CSCF) for controlling calls to be established from a subscriber (A, B) to a communication destination (B, A), a service control entity (SCP) for controlling services provisioned in said network for a respective subscriber, and a detection entity (DP) adapted to detect at least one of a plurality of predetermined conditions occurring in said network; said method comprising the steps of:

forwarding a signaling message from said subscriber (A) to said at least one call control entity (CSCF) for being further forwarded to said destination (B), said signaling message comprising a message header and a message body, said message header including information descriptive for a content carried in the message body, detecting the occurrence of said at least one predetermined condition, and in case the occurrence of said predetermined condition has been detected, sending information concerning the content carried in the message body of said signaling message to said service control entity (SCP).

According to advantageous further embodiments, according to the proposed method said detection entity informs the service control entity (SCP) of the occurrence of said predetermined condition, and in response thereto, the service control entity (SCP) requests the call control entity (CSCF) to send said information concerning the content carried in the message body of said signaling message to said service control entity (SCP);

said at least one of a plurality of predetermined conditions is related to a state of call establishment of a call between said subscriber (A, B) and said destination (B, A);

said state of call establishment is indicated by a type of a signaling response message;

said state of call establishment is an unsuccessful call-setup;

it further comprises a step of analyzing said information concerning the content carried in the message body at said service control entity (SCP), and dependent on the result of analyzing, requesting said call control entity (CSCF) to send at least a part of said content of said signaling message to said service control entity (SCP);

it further comprises a step of processing said content sent from said call control entity (CSCF) to said service control entity (SCP) at said service control entity;

said processing comprises modifying said content of, deleting said content of or adding a new content to the signaling message body;

only predetermined information concerning the content carried in the message body of said signaling message is sent to said service control entity (SCP);

said predetermined information are specific types of content carried in said signaling message;

said specific types are preselected at the call control entity (CSCF);

said specific types are preselected at the call control entity based on subscriber specific selection data;

said signaling message is a Session Initiation Protocol (SIP) message and wherein said contents carried in said message body are Multipurpose Internet Mail Extension (MIME) type contents;

said service control entity (SCP) sends the processed content to the call control entity (CSCF) and requests the call control entity to deliver said processed content;

delivering said processed content is effected via a data link different from a data link used for a call;

said different data link to said destination is established via a WAP gateway and/or the Internet Furthermore, according to the present invention, there is provided a call control entity controlling calls to be established from a subscriber to a communication destination in a communication network, comprising: a transceiver means adapted to receive a signaling message from said subscriber and to forward said signaling message to said destination, said signaling message comprising a message header and a message body, said message header including information descriptive for a content carried in the message body, a control means adapted to be responsive to the detection of the occurrence of at least one predetermined condition occurring in said network, wherein in case the occurrence of said predetermined condition has been detected, said control means sends information concerning the content carried in the message body of said signaling message to a service control entity.

In addition, the present invention provides a service control entity controlling services provisioned in a network for a respective subscriber, a subscriber establishing calls to a communication destination in a communication network using a signaling message comprising a message header and a message body, said message header including information descriptive for a content carried in the message body, said service control entity comprising: control means adapted to be responsive to a detection of at least one predetermined condition occurring in said network, wherein in response thereto, the service control entity is adapted to issue a request to a call control entity for information concerning a content carried in the message body of a signaling message to said service control entity.

Advantageous further developments of the call control entity and the service control entity according to the present invention are set out in the respective dependent claims.

Moreover, the present invention concerns a communication system comprising a call control entity controlling calls to be established from a subscriber to a communication destination, as defined above, a service control entity controlling services provisioned in a network for a respective subscriber, as defined above, wherein said system is adapted to operate according to the method as defined above.

Accordingly, the present invention enables the service control entity to have information about the call on hand, which include also specific information intended to be transmitted in the call (i.e. a content of the call). Still further, at least some of said content/specific information could be delivered always to the destination using an alternative delivery scheme, i.e. by delivering information/content via a data link different from a data link used for a call.

For a caller, this service is flexible and quick to use, as often just a call request, even in vain, is enough to indicate the call attempt and some information to the called destination. Thus, leaving a voice message is no longer necessary and may just be effected if desired.

For the called person, i.e. a subscriber at the destination terminal side, managing of call requests at his own terminal is simplified compared to the multi-step retrieval procedure from a voice mail box.

Still further, from a network point of view, the proposed method frees voice mail system capacity for other services where voice messaging or voice content has some real value. Also, content already carried in the SIP message can be made available to the callee and thus will not have to be retransmitted later on. Hence, there is no longer a wasteful use of network transmission capacity to be used for retransmission.

BRIEF DESCRIPTION OF THE DRAWINGS

Still further objects, features and advantages of the present invention will become more fully apparent when referring to the description of embodiments of the present invention in conjunction with the accompanying drawings, in which.

DETAILED DESCRIPTION OF THE EMBODIMENTS

The present invention will be described hereinafter in detail with reference to the drawings.

Figure 1:
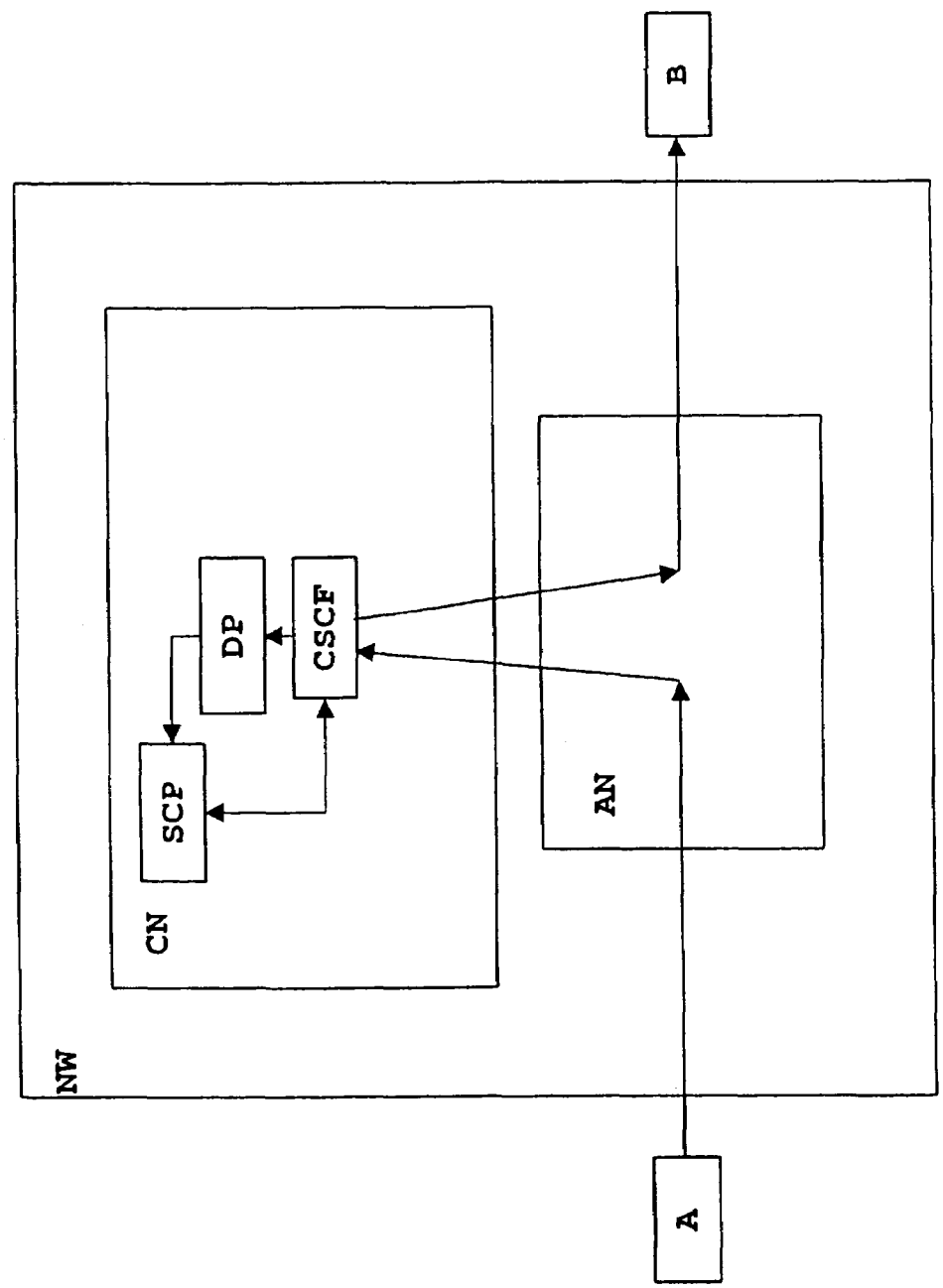
FIG. 1 shows in rough outline the basic constituents of an example of a communication network.
Figure 2:
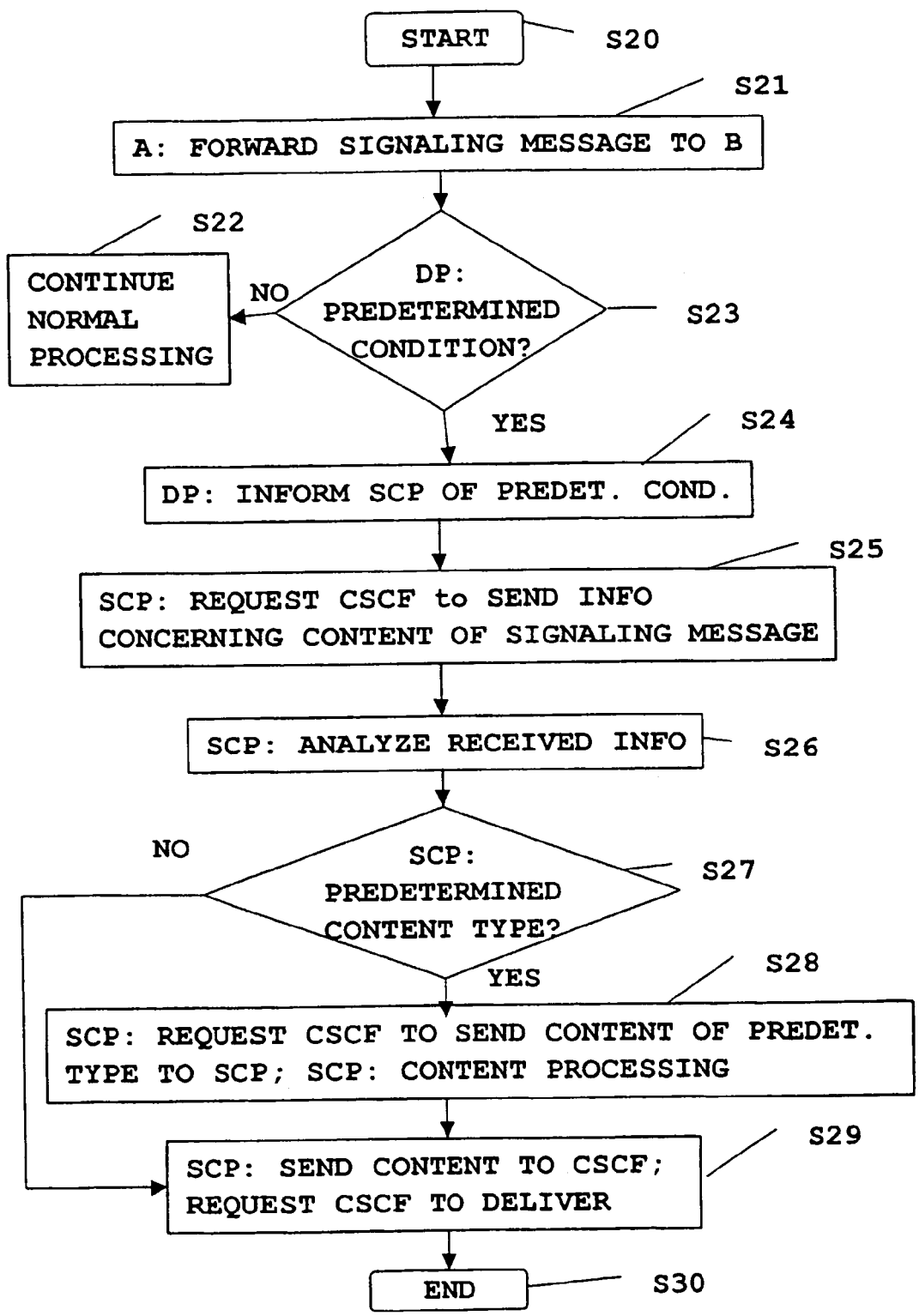
FIG. 2 is a flowchart of different steps and signaling involved among the network entities in connection with the present invention.

FIG. 2 shows a flowchart of signaling exchanged between and of processing steps effected by network entities shown in FIG. 1. The signaling/processing starts in step S20. In step S21, a subscriber initiates, at his terminal A, a call establishment in order to establish a call to a communication destination such as a terminal B of another subscriber, by sending a corresponding signaling message via the access network AN and the call control entity such as a call state control function CSCF of the core network CN to B. The signaling message is a SIP message such as for example SIP INVITE, the signaling message comprising a message header and a message body, said message header including information (e.g. content type, content length) descriptive for a content (for example MIME type contents) carried in the message body.

The core network CN is provided with a detection entity such as a detection point DP. This may be a separate entity or may be implemented as a functional part of other entities of the network. The detection entity is adapted to monitor one or more conditions prevailing in the network and to detect and inform about specific conditions for the detection of which it is armed. (Note that a detection point sometimes is referred to as just a state or event in call processing. The call processing method/algorithm implemented at the CSCF encounters predefined events or states in call processing that are in such cases referred to as detection points.) In step S23, the detection point DP checks, whether a predetermined condition has occurred in the network, i.e. whether the network is in a predetermined state. For example, such predetermined conditions are related to a state of call establishment of a call between said subscriber A and said destination B, wherein said state of call establishment is indicated by a type of a signaling response message (for example above mentioned SIP response messages). More specifically, for example, the state of call establishment is an unsuccessful call-setup indicating that the destination B could not be reached. Nevertheless, other predetermined conditions may be monitored and evaluated by the detection point DP. Also, more than one condition may be monitored and evaluated in a logic combination. Stated in other words, a predetermined condition is intended to mean any combination of one or more network conditions and/or network states.

For example, another condition to be detected by the detection point within the call set-up processing performed by the CSCF is just the receipt of a SIP INVITE message. Thus, this condition at the detection point is encountered always when a SIP INVITE message is received. Of course, the triggering of a query or indication in this condition at the detection point to the service control entity may be performed only for the subscribers, who have the detection point armed within their subscriber data trigger information. If there is a call processing statemodel within the CSCF, the CSCF must store for each individual call and/or call instance, the call set-up information within the SIP INVITE message and subsequent messages, in order to be able to deliver this information to the service control entity during subsequent call set-up processing.

Another condition for a detection point is associated to and/or located in CSCF call processing statemodel and particularly enabled at the phase where the called party user equipment (e.g. mobile station) acknowledges the received SIP INVITE message using, for instance, the SIP message "100 trying". At this stage it is known that the contents sent to the user equipment in the INVITE call set-up message were received successfully and that the bandwidth consumption caused by their delivery actually took place. If the predetermined condition is not detected (NO in step S23), the flow branches to step S22 and a normal processing for signaling message processing is continued, which will not be described here in detail, since the normal processing is of no particular relevance for the present invention.

If, however, the predetermined condition is detected (YES in step S23), the flow proceeds to step S24. In step S24, the detection point DP informs the service control entity SCP of the occurrence of the predetermined condition. Thereupon, in step S25, the service control entity requests the call control entity to send information related to the content of the signaling message to the service control point. This information may be the information included in the header of the signaling message. Optionally, the entire header information is not necessarily be sent to the service control entity SCP, but rather predetermined parts of the information included in the header are sent to the SCP. This means that only message content types marked in the CSCF or in trigger data associated with the subscriber e.g. in a Home Subscriber Server entity HSS (not shown in FIG. 1) and which are sent to the CSCF at a location update, are sent to the service control entity SCP. The service control entity SCP is not bothered about irrelevant content types or content types not interpretable by the service control entity. Alternatively or additionally there could also be service control means specific data specifying the relevant content types. Note that the service control entity SCP may be an external and/or separately provided SCP or a service execution environment associated to the CSCF. An interface between SCP and CSCF can be object oriented such as a CORBA (Common Object Request Broker Architecture) interface or based on HTTP (HyperText Transfer Protocol), or just a programming API (Application Programming Interface).

In a subsequent step S26, the service control entity SCP analyzes the received information. If the analysis yields in step S27 that predetermined content types have been sent to the SCP, the flow proceeds to step S28.

In step S28, the SCP requests the CSCF to send the content of the indicated predetermined type to the SCP, and the SCP processes the thus received content. Such a processing may reside in modifying said content of, deleting said content of or adding a new content to the signaling message body. A combination of deletion and addition of contents may result in a replacement of some contents. Of course, an entirely new content may be requested by the service control entity to be inserted to the SIP INVITE message. No existing ones are deleted. Besides, there may (previously) have been no MIME type contents in the SIP INVITE message. For example, contents may be replaced by a prestored content such as a greeting content. Such a content prestorage may be effected by the calling party (A) to the SCP or to a database location (not shown) accessible by the SCP. The SCP retrieves the contents based on calling party identification and some message identifier carried in the message. The SCP then sends these (retrieved) contents to the CSCF to be added to e.g. SIP INVITE message to the destination terminal. Also, there could be a URL carried in the SIP message by means of which the SCP retrieves the content and sends them to the CSCF. Also, content conversion or deletion can be based on information about terminal content presentation capabilities. These are obtained by inquiring from the SCP the terminal capability information cached to the network.

Upon completion of the processing at the SCP, the SCP sends the processed content to the CSCF and requests the CSCF to deliver the signaling message including the processed content.

Several options exist for the delivery of the MIME type contents or other similar contents encapsulated in SIP messages to the service control entity SCP. Example embodiments of such options are explained further below with reference to FIGS. 4 and 5.

If the analysis yields in step S27 that no predetermined content types have been sent to the SCP, the flow proceeds directly to step S29 while omitting step S28. Thus, content of the signaling message is not processed at the SCP, but the signaling message is delivered unmodified from the CSCF. Alternatively, in case of NO in step S27, another processing (not shown in FIG. 2) could be carried out such for example delivery of a predefined content such as a greeting content, or a guestbook service creation referred to herein below.

Note that in the chosen example it has been assumed that a call establishment to the called destination B has failed, which failure was detected as a predetermined condition. Therefore, delivering the signaling message can not use the data link and/or communication channel used for a call, i.e. from the CSCF via the access network AN to terminal B. Rather, a different data link as compared to that data link has to be used. Generally, messaging mailboxes may be used for the alternative delivery. For example, an e-mail data link to an e-mail address of the destination B could be used for delivery of the content. Thus, the contents may have to be embedded to an e-mail message generated at the SCP.

Thereafter, the process ends in step S30.

Thus, as mentioned above, firstly only message content types and other information about them is indicated to the service control entity. The service control means then, upon analysis thereof, requests the actual contents from the call state control means (e.g. CSCF or SIP call processing server), if the type of the contents is relevant or of interest for the service application.

Accordingly, as has been described herein above, the SIP message content is send from the CSCF to the SCP, if the SCP request it. Thus if a detection point triggers and/or detects when a call connection is unsuccessful, the SCP gets information about the call. This information includes listing of MIME types that the content of the call has. The SCP can then consult a subscriber specific logic to learn how to handle each MIME type in each trigger situation, e.g. "if call is unsuccessful and call includes a picture then request the CSCF to send the picture to SCP and send the picture with e-mail to address XXX", where XXX is an e-mail address corresponding to the initial destination B. Although SCP has been mentioned as an entity actually carrying out the invention, it is not limited thereto. Any entity adapted to carry out the described functionality may be suitable for the purpose of the present invention. Stated in other words, according to the present invention SIP message contents are intercepted and provisioned to the SCP from the CSCF in case the SCP requests so, for instance, when arming the event detection point(s) for unsuccessful call set-up. The SIP message contents could be sent to the SCP and converted into multimedia store and forward messages or WAP push messages to be delivered.

This could enable a greeting content to the recorded by the calling party and having it delivered always in case of unsuccessful call set-up. The content could be parameterized by the calling party so that it is delivered only in case of unsuccessful call set-up. Similarly, there could be different contents for different outcomes in call set-up.

Still further, the present invention enables the provisioning of a guestbook service where browsable content (e.g. web or WAP pages) are created to and/or at a content server. Then, there are created entries indicating time of incoming call and information from SIP message headers such as subject and caller ID. If there have been contents present in the SIP INVITE messages related to call set-up attempts, these contents, being of suitable type such as a picture (JPG, GIF, TIFF) or video clip (MPEG, Quicktime), are as well added to the guestbook content created for a subscriber at the content server. Also, the decrementation of prepaid charging credit based on chargeable contents is enabled. The SCP (service control entity) determines which content types should be charged or not, i.e. SDP (Session Description Protocol) contents, which is used to carry information about media channels, is not to be charged, but MIME type contents could be charged according to type and/or size and/or destination and/or time etc.

There can also be rules for the decrementation of prepaid credit for a receiving subscriber. This means that certain types of contents can be free or that contents up to a given length are free. Similarly, there can be a function that determines the amount of credit to be decremented based on content length.

Figure 6:
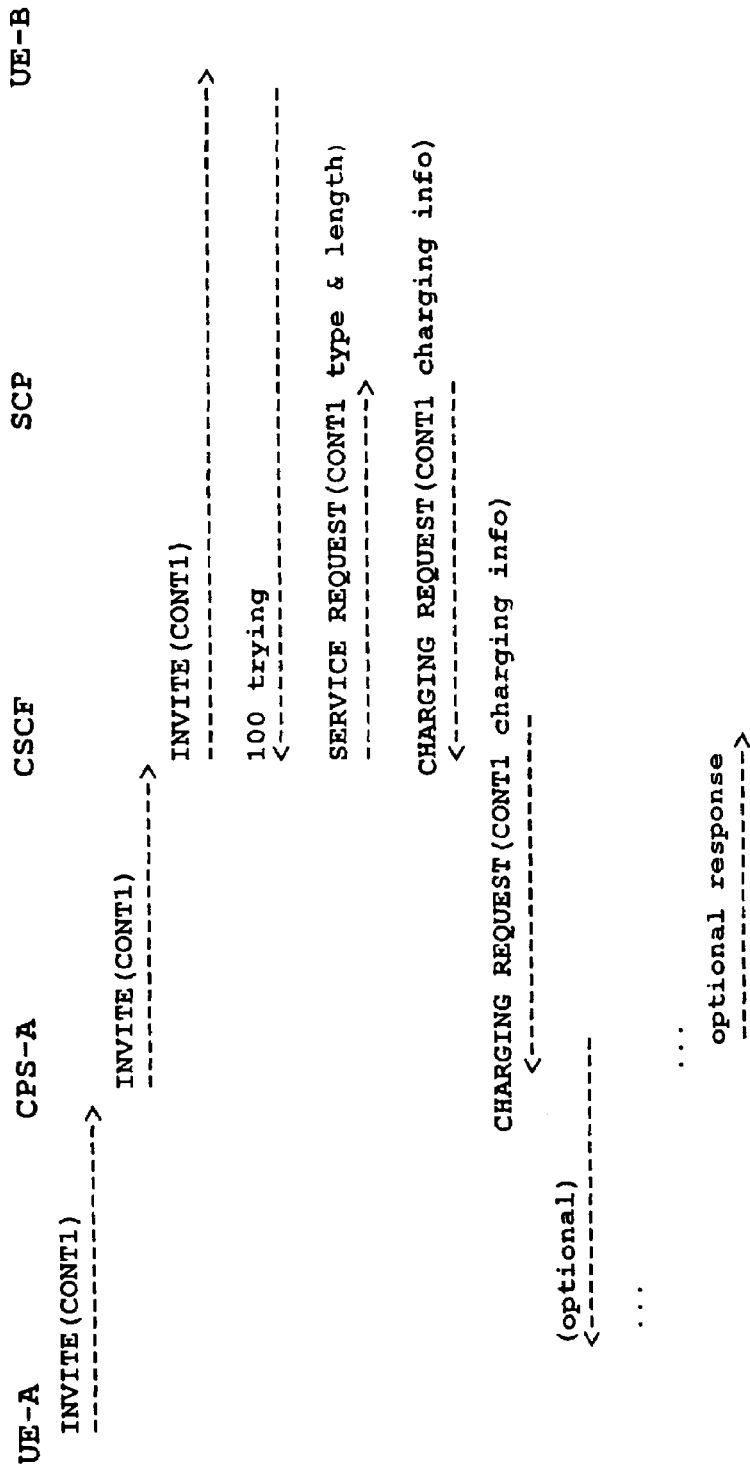

As shown in FIG. 6, the prepaid service can be beneficially triggered, i.e. invoked, at the service control entity at the detection point of CSCF call processing where the user equipment had acknowledged the SIP INVITE message using the 100 trying message. At that detection point, at least the content type of the content delivered to the user equipment in INVITE is reported by the CSCF to the service control entity. The content length may also be report, maybe even the content itself.

The service control entity knows at this detection point that the content was successfully delivered to the user equipment. Thus the prepaid credit can be decremented.

Generally, there can be a function that receives as argument the content type and length, then the function returns the amount of prepaid credit to be decremented for the subscribers credit. The function can take extra arguments such as the remaining credit, the amount of contents received during a given earlier time period, the calling subscriber identity, etc.

The prepaid account may be stored at the service control entity or in a separate server communicating with the service control entity. The prepaid account stores the user specific credit.

In addition to the prepaid service other charging services can be thought of. It may be possible that the contents to be delivered to the called party in the SIP INVITE message are considered as extra information, not subscribed by the called party. Therefore, if the called party paid extra for the delivery of such contents, it could be considered unfair for the called party.

One simple service might be the deletion of these contents due to a service in the service control entity, which instructs the CSCF to delete the extra contents to be paid by the called party. For instance, the service control entity might recognize the content types, the delivery of which costs extra for the called party, and due to service data associated with the called party, make the decision to instruct that these be deleted.

It can be conceived also that if the called party should pay for the delivery of extra contents in forward direction signaling messages, the charging service triggered at the service control entity might decide to charge the calling party for these extra contents. This means that the service control entity instructs the CSCF to send a charging message in backwards signaling towards the calling party. The receiving of the charging message at the calling party side, for instance, in the calling party call processing server causes that charging is accrued for the calling party for the content.

The actual implementation of the charging accruing for the calling party may vary. It can be conceived that simply a charging record (CDR) is created at the CPS (call processing server) based on the charging request message. In other implementations an E-cash withdrawal from the calling party electronic purse is performed at the receiving of the charging request message. The purse may be stored in association with e.g. either UE-A or CPS-A or an SCP for the calling party.

The E-cash amount withdrawn may be delivered towards the called party operator. Similarly, a calling party prepaid account may be debited at the receiving of the charging request message FIG. 3 shows a signaling scenario in connection with the present invention, where the SIP message contents could be sent to the SCP and converted into multimedia store and forward messages, or to WAP push messages to be delivered, or where a guestbook service could be provisioned with browsable content (e.g. web or WAP pages) being created.

Figure 3:
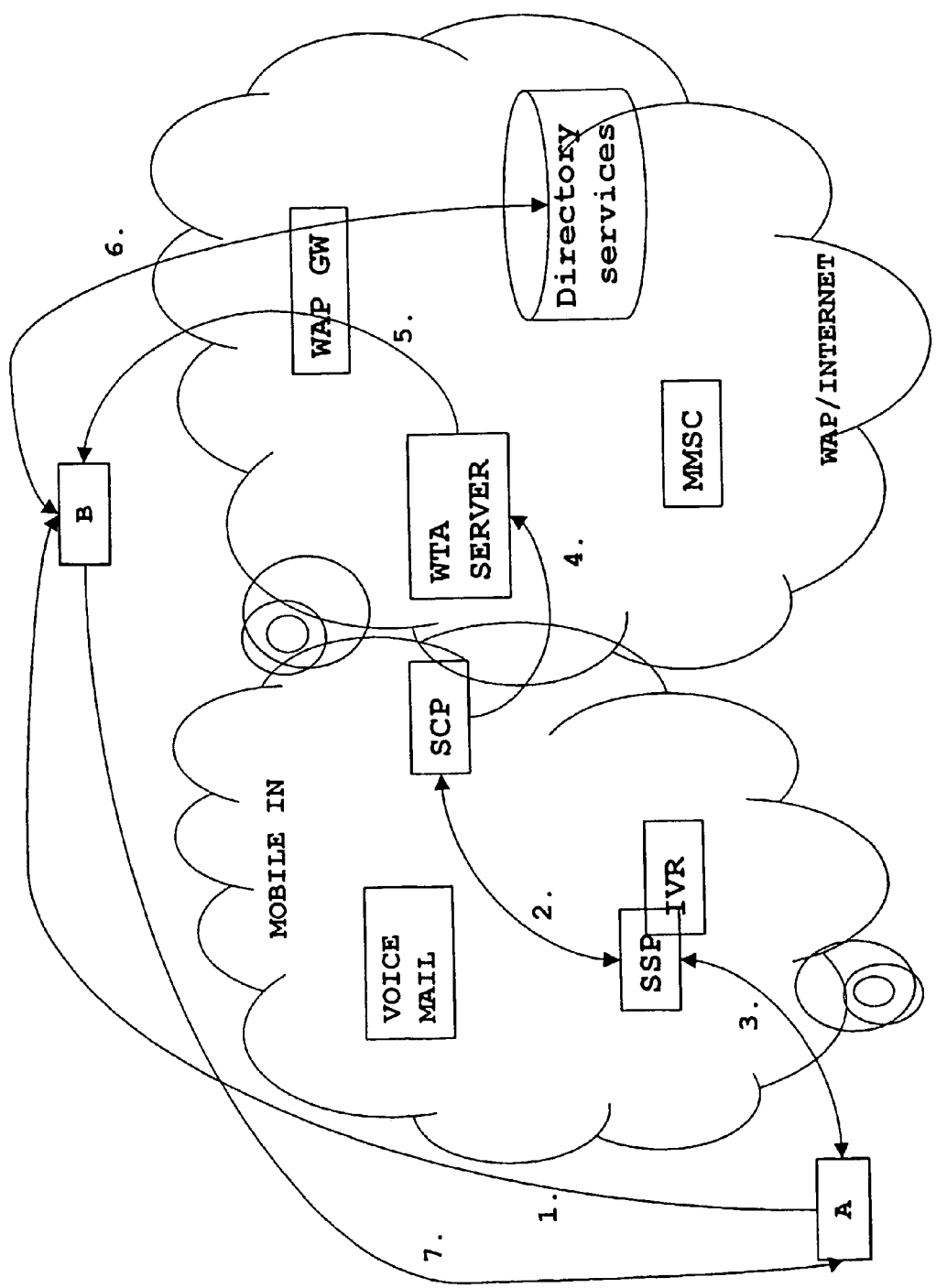
FIG. 3 is a diagram illustrating a basic signaling scenario in connection with the present invention implemented in a mobile IN network in connection with a WAP/Internet network.

The scenario shown in FIG. 3 makes use of a communication network consisting of a seamless distributed implementation of a mobile Intelligent Network (mobile IN) and a WAP/Internet network. Note that for explanatory purposes the network is represented in a quite simplified manner, i.e. network entities involved in implementing the present invention are shown while those entities of minor or no relevance for the present invention are omitted from the figure. The method according to the present invention is implemented in the network.

The mobile intelligent network as shown in FIG. 3 comprises a Service Switching Point entity SSP which comprises features of the call control entity CSCF as well as of the detection point entity DP. Associated to the SSP, there may optionally be provided a Interactive Voice Response IVR server. A voice mail entity as an "answering machine" implemented in the network is optionally also provided for. Furthermore, the mobile intelligent network is provisioned with a service control entity SCP. Conventionally, in case a callee (terminal B) is not reachable, the SCP directs the SSP to connect the call to the voice mail so that the caller may leave a spoken message for the callee B.

It is to be noted that, throughout the present specification intelligent network (IN) concept designates any solution in which a call, connection or session processing node contacts a service control function which issues instructions to the respective node. For instance, the contact to the service control function is based on a trigger information stored in the respective nodes, or obtained to (i.e. for) the respective nodes from a subscriber information database. The trigger information may specify situations in the course of a call, connection or session handling. For instance, the service control function may be internally distributed. Moreover, the corresponding IN protocol could be any protocol between a controlling entity, such as a service control function (e.g. Camel CSE [CAMEL=Customized Application for Mobile network Enhanced Logic; CSE=CAMEL Service Environment]), responsive to triggering from a call, and a session or connection processing node. The IN protocol may be e.g. an object oriented interface where the operations are object methods or invocations. The service control function may reside within the above mentioned processing node thus making essentially the protocol towards the service control function entity an application programming interface.

The WAP/Internet network has a WTA server (Wireless Telephony Application), a WAP (Wireless Application Protocol) gateway WAP GW providing a gateway and/or interface to a terminal (here: B) via some access network (not shown), and a Multimedia Messaging Service Center MMSC. Also, a database entity named directory services can be provided for. As these components and their basic functionalities are believed to be known to those skilled in the art, a detailed description thereof is omitted here and a focus is laid only on those functionalities in connection with the present invention.

Signaling between these entities is indicated by arrows denoted with numerals 1 to 7 which represent the order of signals in time. Firstly, terminal A signals in a call attempt (1.) that it wishes to establish a call to terminal B as a communication destination. This call attempt is represented by a SIP signaling message such as SIP INVITE, as explained herein above, which may carry some contents in its message body. Under the assumption that the destination B is not reachable or does not answer, i.e. the call setup is indicated in a network state as being not successful, the SSP acting as a detection point detects this state (predetermined condition) and triggers (2.) the execution of the further steps of the method according to the present invention. This means, that in general the processing as described in connection with FIG. 2 is initiated.

In a third step signaling (3.) the SSP prompts the caller of the detected condition using e.g. a greeting content. A user interface for a (non-successful) caller may be implemented by the aid of the IVR server or announcements and DTMF (Dual Tone Multi-Frequency) functions of the SSP. However, as the greeting content to the caller is of subordinated relevance in connection with the present invention, a further description thereof is considered to be dispensable. With a user interface, a user's (caller's) input could be collected in the signaling (3.). However, in case of SIP signaling messages being used, basic user information inputs such as user identity and/or subject and/or contents of the message in its message body are already present. Hence, the collecting step is not necessary.

The SCP will therefor receive information from the SSP/CSCF such as the caller's identification, the entry to the subject field of a SIP signaling message, and/or an indication of contents included in the SIP message body (cf. step S25 in FIG. 2). The SCP then conducts an analysis on the obtained information basically as described in connection with FIG. 2.

Case A):

If, for example, step S27 in FIG. 2 yields that no content at all (and thus also no predetermined content) or just no predetermined content (but nevertheless some content) is contained in the message body, in a modified step S29 (not shown in FIG. 2) the SCP may perform a logging, see step (4.) of FIG. 3, of the call request to the WTA server. The logging information may then include the caller's identity, for example in combination with the information contained in the subject field. This logging information then represent a kind of a guestbook of those callers which tried to call the terminal/destination B. A most recent logging entry to the guest book is then pushed, step (5.) in FIG. 3, via the WAP gateway WAP GW, as a WAP PUSH message to the destination B. The indication of a call request as such together with text (e.g. entry in the subject field) is then indicated to the callee (B) after the WAP push delivery from the network service (i.e. after terminal B can be reached again).

Case B):

Also, if, for example, step S27 in FIG. 2 yields that no predetermined content (but nevertheless some content) is contained in the message body, according to step S29 (as shown in FIG. 2) the SCP may instruct the CSCF (SSP/IVR) to deliver the content. Note that in this case, the SCP need not send the content to the CSCF, as the content was not transferred from the CSCF to the SCP for processing purposes.

Case C):

Also, if for example, step S27 in FIG. 2 yields that predetermined content is included in the SIP message body, the processing as illustrated in FIG. 2, steps S28, S29 is performed.

Thus, the SCP in case B) and C) requests the CSCF (SSP/IVR) to deliver a content (original content of SIP message body or processed content (e.g. replaced by a greeting content to the destination)).

Thus, if the call set-up has failed or if otherwise desired, the SCP may decide to deliver the content using alternative means. Delivery may be achieved by using the multimedia messaging service center or generally via the multimedia messaging service environment (MMSE). This means, for instance, that from the SCP there is an interface to the MMSE. This interface can, for instance, be based on simple mail transfer protocol (SMTP). The SCP composes an SMTP message comprising a text part specifying typically call set-up attempt details such as caller, time and call subject from SIP INVITE message. The message also comprises the call set-up message contents (e.g. from SIP INVITE message). It is then up to the MMSE to deliver the message as discussed in 3GPP specification TS 23.140 (e.g. version 4.1-0, 2000-12).

Other equivalent store and forward delivery mechanisms can be envisioned. The SCP can also interface a standard mail delivery system and from there a mailbox for the called party.

The delivery of greeting contents relating to unsuccessful call set-up attempts can be facilitated in several ways. For instance, when the mobile station (MS) i.e. mobile terminal for the called party is first powered on, there may be a notification to the MMSE. The MMSE will then automatically deliver a notification to the MS on the calls missed and the multimedia messages composed by SCP relating to unsuccessful call attempts are pushed automatically to the MS.

Similarly, there can be a power-on or reachability notification to the SCP or to a called party specific WAP server on the network attach of the MS. This may cause that the guestbook content composed by a content server relating to unsuccessful call set-up attempts to the called party is pushed to the called party. This means that the content is automatically delivered to the called party. The delivery is preceded by address activation for the called party so that the content can be delivered to her address. The push may be implemented using e.g. WAP content push mechanisms or using the push mechanisms specified in 3GPP push specifications TR 23.874 (e.g. version 1.3.0).

If the called terminal B is capable to receive multimedia message service MMS messages (e.g. including MIME type contents such as audio/video etc.), the callers message (i.e. contents thereof) is converted to the MMS format and sent, for example by the SSP/IVR, to the MMSC. The MMSC in turn will deliver the message contents by pushing it (via the WAP GW) to the called terminal B. Thus, delivering said (processed) content is effected via a data link different from a data link used for a call. Note that MMS format has been chosen as an example only and that for example a conventional e-mail format may also be applicable for embedding the contents therein, in case the content is delivered as an e-mail to the terminal B.

In any of the above cases, if the caller's identity is indicated to the callee only by use of a calling line identity CLI which is not known/stored in the terminal B, in a step (6.) a database query can be implemented to learn, who owns this telephone number. The database labeled directory services in FIG. 3 may be any suitable database in the network such as the HSS containing a table of subscriber names and associated telephone numbers.

Also, in any of the above cases, based on the logged call request information available to the callee terminal B, the subscriber B may initiated a call back, step (7.), to the caller.

Figure 4:
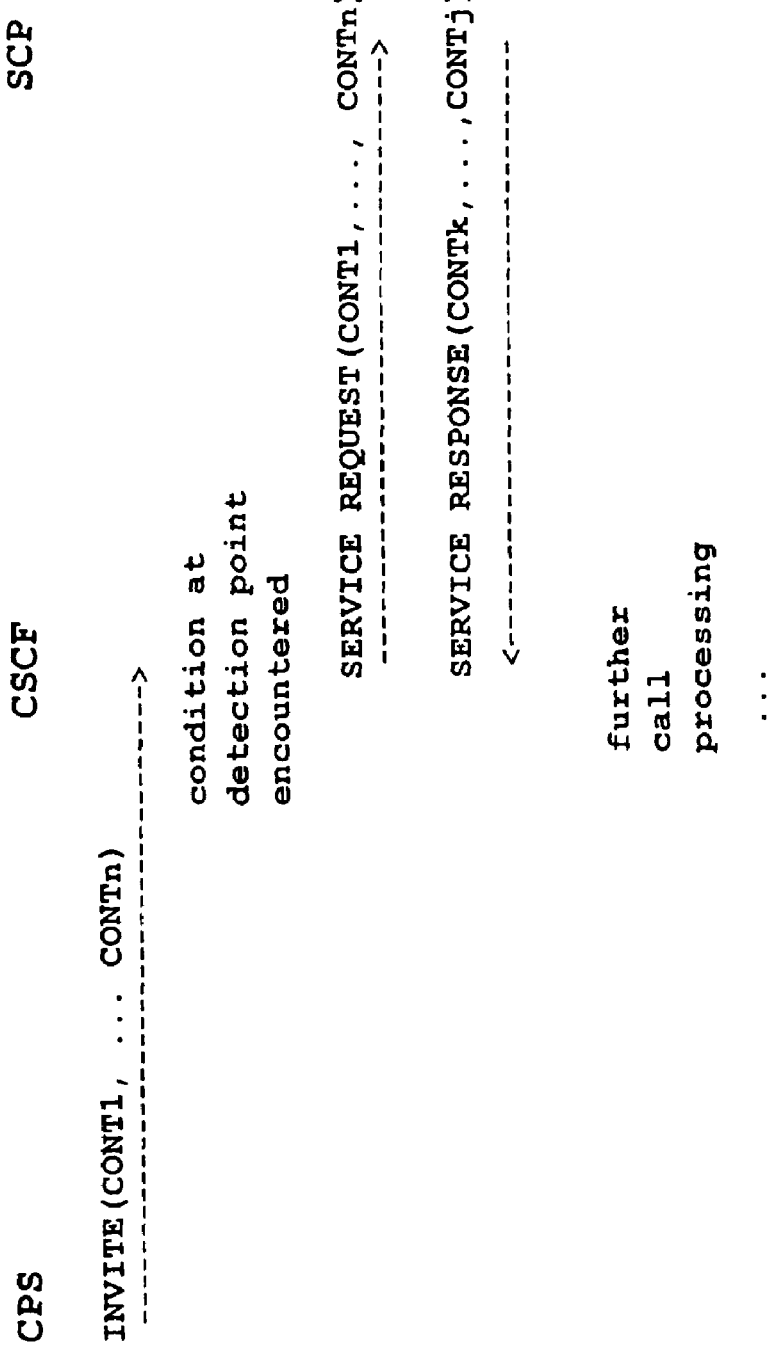
FIGS. 4 to 7 show signaling diagrams of modifications of embodiments of the present invention.

FIG. 4 illustrates one embodiment of the invention, according to which the entire SIP message or its relevant parts, excluding some information only relevant for the CSCF such as SDP (Session Description Protocol) elements, are always sent to the service control entity at a given condition detected at the detection point. In FIG. 4, (CONT1, . . . ,CONTn), wherein n belongs to the set of natural numbers, represents the set of contents received by the CSCF prior to condition detection at the detection point is encountered. The contents CONTk, . . . ,CONTj may be entirely new contents not thus representing modified contents of the set CONT1, . . . ,CONTn. It should be noted that the SCP may only modify a subset of the contents (CONT1, . . . CONTn) in its response. Similarly, it is possible that the SCP sends extra contents not present in the original set (CONT1, . . . CONTn). Generally, the SCP is provided with means to insert, delete or to replace contents to/from the set CONT1, . . . ,CONTn.

Of course, not all the contents CONT1, . . . ,CONTn may have been received in the INVITE message itself. Some or all may have been received in other forward direction signalling messages. Further, it is possible that the set CONT1, . . . ,CONTn represents only the set of contents relevant for the services in SCP. The set of contents relevant for a service can be determined, for instance, in the trigger data of the CSCF.

Figure 5:
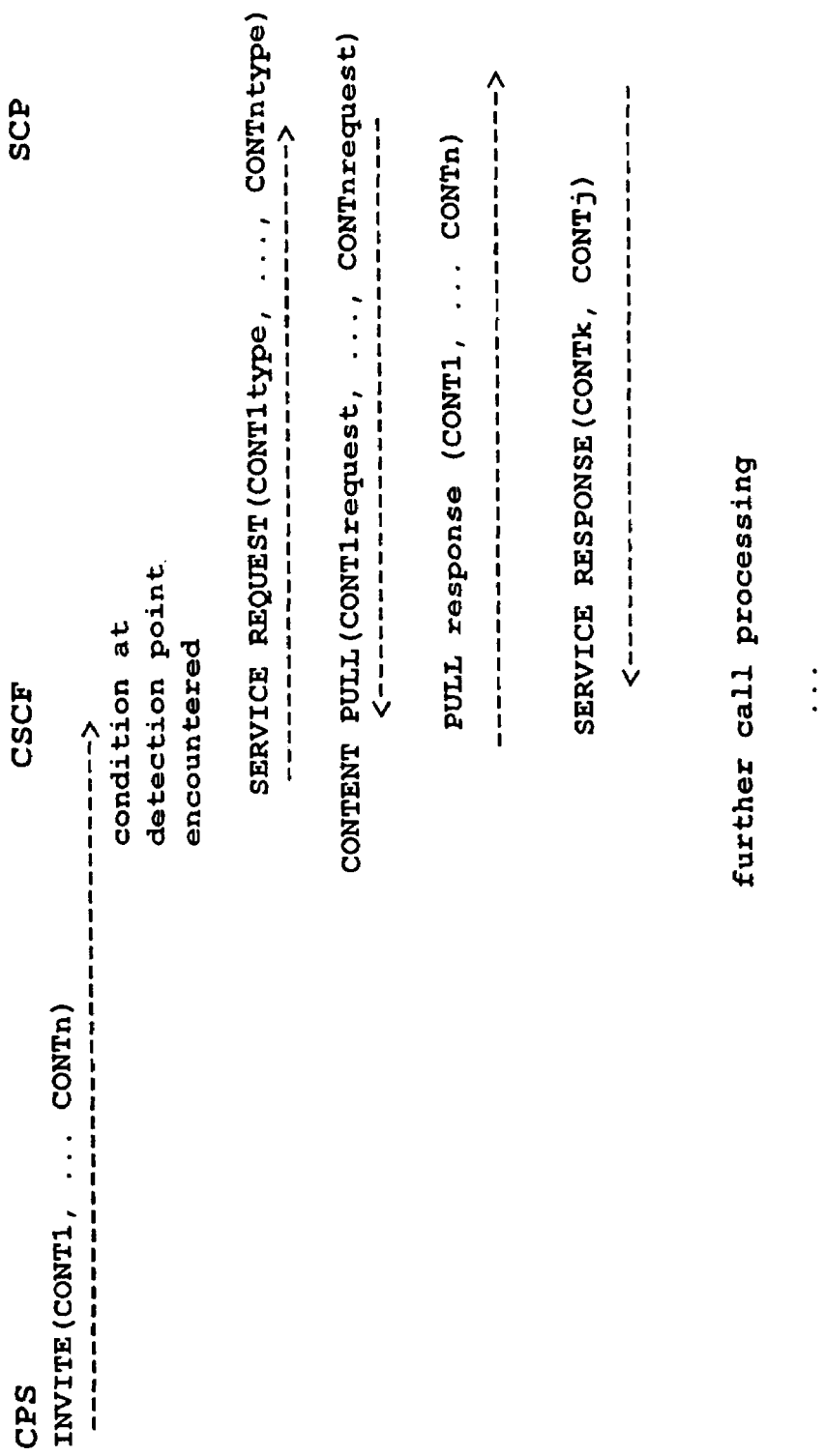

In an another embodiment of the invention as shown in FIG. 5, in order to reduce signalling load to an external SCP or to reduce copying to an internal service control entity, the SERVICE REQUEST message carries only information on the types of contents present in the call set-up information received, e.g. information received in SIP INVITE message or other subsequent call set-up related messages. In this embodiment of the invention it is up to the SCP to decide whether it need to retrieve separately the actual entire contents from the CSCF. Only part of the contents received by the CSCF related to a call set-up may be requested by the SCP.

Figure 7:
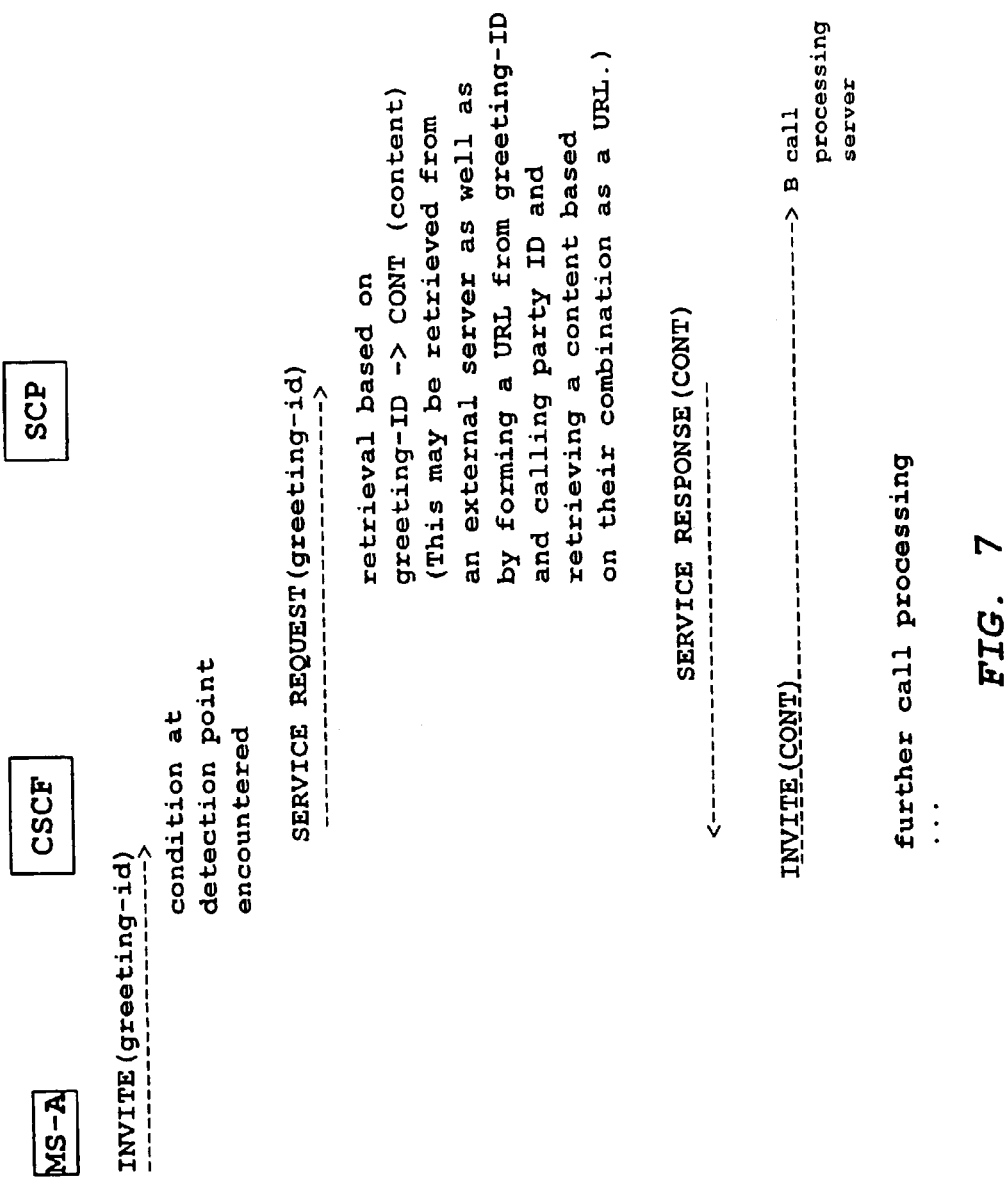

In the cases where the calling party has a mobile terminal, it may be beneficial by the SCP at the calling party side to add the MIME contents (not necessarily relating to SDP media descriptions) to the outgoing INVITE message, as it is shown in FIG. 7. In this way the radio bandwidth is spared on the calling party side. Also the sending of INVITE message is expedited in the way that the INVITE message may be sent using IP/UDP instead of TCP/IP. Otherwise an INVITE with large MIME contents would have to be sent using TCP/IP due to UDP message size limitation. Thus, there is a service for the calling party which adds the MIME contents e.g. greeting contents based on some indication in the INVITE message from the terminal such as a specifier in from-header or in subject header. The content may have been stored to the SCP or to a content storage by the calling party beforehand.

Note that the call processing server CPS is located in the core network, and that SIP architecture is present to a certain degree in parallel to 3GPP architecture in terms of the CPS (SIP server) and CSCF (3GPP server). Just to give an explanatory example, for instance in a university campus environment, there could just be a small CPS serving the workstations of a single network segment comprising up to a few dozen workstations with telephony and multimedia capabilities. In this kind of environments there is no need to distinguish between access and core networks. The network connecting the CPS to each of the workstations can be seen to play the role of both access and core networks. Further, if a WLAN is incorporated into the example scenario, there could be a separate WLAN constituting an access network with a few base stations. These base stations could be served by a few routers. Further, there could then be at least one SIP CPS serving the entire WLAN environment.

It is to be noted that in the preferred embodiment of the invention, the SIP CPS used is independent of a mobile station location within the wireless access network. The same applies in larger scale in large mobile networks in accordance with 3GPP specifications.

Note that in FIG. 6, the CPS-A is in the role of the SIP server for CALLING SUBSCRIBER, whereas the CSCF is playing the role of a SIP server for the CALLED SUBSCRIBER. The CPS-A is in the figure purely to illustrate that there could be a SIP server for the calling party in the network. The CSCF (for the called party) has a more elaborate role since it is equipped with capability to contact the service control function SCF (i.e. the SCP service control point) for the alternative delivery services, and it is triggering the service for the called party.

What should further be noted concerning FIGS. 4 and 5 is that the aim of these figures is to illustrate the signaling between the CSCF and SCP. There could be a CPS from which the messages are received to the CSCF or they could come even directly from a calling party terminal. It should be noted that in FIGS. 4 and 5 the CSCF could also be a centralized SIP server, dedicated for certain services, which could provide services either for the calling or the called party.

Thus, it is noted that the CPS is located in FIG. 1 in the core network CN "below" the CSCF so that a call/session initiated from terminal A may be routed via the CPS to the CSCF.

In FIG. 7, the service is for the calling party. Therefore, there is illustrated the functionality of the serving CSCF of the calling party. In FIG. 7 there could or could not be an (essentially transparent) proxy CSCF or CPS between the terminal of the calling party and the serving CSCF for the calling party. What is important is that the CSCF is triggering services for the calling party. The service is beneficial since it enables to retrieve a content by an identifier instead of carrying the entire content via the radio interface. The identifier could be an URL picked by the calling party from a hypertext browser based greeting content selection service.

In FIG. 6, the illustrated CPS is for the calling party. In FIGS. 4 and 5, the CPS could be omitted, as long as there is just received an INVITE from "somewhere", as from where it is received is not essential for the illustrated functionality between CSCF and SCP. In FIG. 7, a focus is on the functionality for the calling party so that there could or could not be a SIP proxy between MS-A and the CSCF (FIG. 7 shows the case in which there is no CPS provided).

Finally, it should be noted that although entity of the network have mostly be described under a viewpoint of their functional behavior, it is to be understood that the present invention also addresses the entities as such.

Apparently, the present invention concerns the call control entity CSCF controlling calls to be established from a subscriber A, B to a communication destination B, A in a communication network, comprising: a transceiver means adapted to receive a signaling message from said subscriber (A) and to forward said signaling message to said destination B, said signaling message comprising a message header and a message body, said message header including information descriptive for a content carried in the message body, a control means adapted to be responsive to the detection of the occurrence of at least one predetermined condition occurring in said network, wherein in case the occurrence of said predetermined condition has been detected, said control means sends information concerning the content carried in the message body of said signaling message to a service control entity SCP.

Likewise, the present invention concerns the service control entity SCP controlling services provisioned in a network for a respective subscriber, a subscriber A, B establishing calls to a communication destination B, A in a communication network using a signaling message comprising a message header and a message body, said message header including information descriptive for a content carried in the message body, said service control entity comprising: control means adapted to be responsive to a detection of at least one predetermined condition occurring in said network, wherein in response thereto, the service control entity SCP is adapted to issue a request to a call control entity CSCF for information concerning a content carried in the message body of a signaling message to said service control entity SCP.

Advantageously, the service control entity SCP comprises analyzing means adapted to analyze said information concerning the content carried in the message body, and wherein said control means, dependent on the result of issued by said analyzing means, is adapted to issue a request to said call control entity CSCF to send at least a part of said content of said signaling message to said service control entity SCP; a processing means adapted to process said content sent from said call control entity CSCF to said service control entity SCP; wherein said processing means is adapted to modify said content of, to delete said content of or to add a new content to the signaling message body; and a transmission means adapted to send the processed content to the call control entity CSCF, and wherein said control means issues a request to the call control entity to deliver said processed content.

Also, according to a modification of the present invention, the detection entity can also be a service logic or an application program executed in service execution means outside the basic call control functionality of a CSCF. The receipt of call and/or session set-up messages, e.g. SIP methods, can be conditionally or unconditionally be reported to the detection entity, which makes the decision to forward the session set-up information relating to e.g. received SIP methods to the actual service control entity. In an another embodiment of the invention, the detection entity just comprises the basic session and/or call control functionality of a CSCF to receive and to react to incoming session set-up messages. In an advantageous embodiment of the invention, the detection entity comprises a filtering means to decide based on the type or content of session set-up messages whether or not to indicate the message related event to service control means. For instance, the filtering means can comprise a functionality related to trigger information processing in a manner similar to intelligent network.

Accordingly, the present invention proposes a method for transmitting data in a communication network, said communication network comprising at least one call control entity CSCF for controlling calls to be established from a subscriber A, B to a communication destination B, A, a service control entity SCP for controlling services provisioned in said network for a respective subscriber, and a detection entity DP adapted to detect at least one of a plurality of predetermined conditions occurring in said network; said method comprising the steps of: forwarding a signaling message from said subscriber A to said at least one call control entity CSCF for being further forwarded to said destination B, said signaling message comprising a message header and a message body, said message header including information descriptive for a content carried in the message body, detecting the occurrence of said at least one predetermined condition, and in case the occurrence of said predetermined condition has been detected, sending information concerning the content carried in the message body of said signaling message to said service control entity SCP. Also, the present invention proposes a communication system comprising a call control entity (CSCF) controlling calls to be established from a subscriber (A, B) to a communication destination (B, A), a service control entity (SCP) controlling services provisioned in a network for a respective subscriber, wherein said system is adapted to operate according to the above method, and also a call control entity and a service control entity as such.

Although the present invention has been described herein above with reference to its preferred embodiments, it should be understood that numerous modifications may be made thereto without departing from the spirit and scope of the invention. It is intended that all such modifications fall within the scope of the appended claims.

The invention claimed is:

1. A method, comprising:
  receiving a signaling message from a subscriber for being forwarded to a destination, said signaling message comprising a message header and a message body, said message header comprising information descriptive for a content carried in the message body;
  detecting an occurrence of at least one predetermined condition; and
  in case the occurrence of said predetermined condition has been detected, sending information concerning the content carried in the message body of said signaling message to said service control entity;
  analyzing said information concerning the content carried in the message body at said service control entity; and
  dependent on the result of analyzing, requesting said call control entity to send at least a part of said content of said signaling message to said service control entity;
  processing said content sent from said call control entity to said service control entity at said service control entity;
  sending, by said service control entity, the processed content to the call control entity and requesting the call control entity to deliver said processed content; and
  delivering said processed content via a data link different from a data link used for a call.

2. A method according to claim 1, wherein said detection entity informs the service control entity of the occurrence of said predetermined condition; and
  in response thereto, the service control entity requests the call control entity to send said information concerning the content carried in the message body of said signaling message to said service control entity.

3. A method according to claim 1, wherein said at least one of a predetermined condition is related to a state of call establishment of a call between said subscriber and said destination.

4. A method according to claim 3, wherein said state of call establishment is indicated by a type of a signaling response message.

5. A method according to claim 3, wherein said state of call establishment comprises an unsuccessful call-setup.

6. A method according to claim 1, wherein said processing comprises modifying said content of, deleting said content of or adding a new content to the signaling message body.

7. A method according to claim 1, wherein only predetermined information concerning the content carried in the message body of said signaling message is sent to said service control entity.

8. A method according to claim 7, wherein said predetermined information are specific types of content carried in said signaling message.

9. A method according to claim 8, wherein said specific types are preselected at the call control entity.

10. A method according to claim 9, wherein said specific types are preselected at the call control entity based on subscriber specific selection data.

11. A method according to claim 1, wherein said
signaling message is a session initiation protocol message and wherein said contents carried in said message body are multipurpose internet mail extension type contents.

12. A method according to claim 1, wherein said different data link to said destination is established via a WAP gateway and/or the Internet.

13. An apparatus, comprising:
a transceiver unit configured to receive a signaling message from a subscriber and to forward said signaling message to a destination, said signaling message comprising a message header and a message body, said message header comprising information descriptive for a content carried in the message body;
a control unit configured to respond to detecting, by a detection entity, an occurrence of at least one predetermined condition occurring in a network and to receive a first request from a service control entity by sending information concerning the content carried in the message body of said signaling message to said service control entity;
wherein said transceiver unit is further configured to receive a second request from the service control entity for the content carried in the message body,
said control unit is further configured to send the content to the service control entity,
said transceiver unit is further configured to receive a processed content from the service control entity, and
said control unit is further configured to replace the content carried in the message body with the processed content such that the forwarding of said signaling message comprises forwarding said processed content in said signaling message.

14. An apparatus, comprising:
a control unit configured to respond to a detection, by a detection entity, of at least one predetermined condition occurring in a network by issuing a first request to a call control entity for information concerning a content carried in a message body of a signaling message received by said call control entity;
analyzing unit configured to analyze said information concerning the content carried in the message body,
wherein said control unit, dependent on a result issued by said analyzing unit, is further configured to issue a second request to said call control entity to send a least a part of said content of said signaling message to said apparatus;
a processing unit configured to process said at least a part of said content of said signaling message; and
sending unit configured to send said processed content to said call control entity and requesting the call control entity to deliver said processed content, wherein the processed content is sent by the sending unit via a data link different from a data link used for a call.

15. The apparatus according to claim 14, further comprising:
a processing unit configured to process said content sent from said call control entity to said apparatus.

16. The apparatus according to claim 15, wherein said processing unit is further configured to modify said content of, to delete said content of or to add a new content to the signaling message body.

17. The apparatus according to claim 16, further comprising:
a transmission unit configured to send the processed content to the call control entity, and wherein said control unit is further configured to issue a request to the call control entity to deliver said processed content.

18. An apparatus, comprising:
a call control entity configured to receive a signaling message from a subscriber for being forwarded to a destination, said signaling message comprising a message header and a message body, the message header including information descriptive for a content carried in the message body;
a determination entity configured to determine the occurrence of a-at least one predetermined condition; and
in case the occurrence of the predetermined condition has been detected, the call control entity is configured to send information concerning the content carried in the message body of the signaling message to a service control entity;
the service control entity is configured to analyze the information concerning the content carried in the message body; and
dependent on the result of analyzing the information, the service control entity is configured to request the call control entity to send at least a part of the content of the signaling message to the service control entity;
the service control entity is further configured to process the content sent from the call control entity to the service control entity at the service control entity;
the service control entity is further configured to send, by the service control entity, the processed content to the call control entity and request the call control entity to deliver the processed content; and
the call control entity is further configured to deliver the processed content via a data link different from a data link for a call.

19. A method, comprising:
receiving, by a call control entity, a signaling message from a subscriber;
forwarding said signaling message to a destination, said signaling message comprising a message header and a message body, said message header comprising information descriptive for a content carried in the message body;
responding to detection of an occurrence of at least one predetermined condition occurring in a network and to reception of a first request from a service control entity, by sending information concerning the content carried in the message body of said signaling message to said service control entity;
receiving a second request from the service control entity for the content carried in the message body;
sending the content to the service control entity;
receiving a processed content from the service control entity; and replacing the content carried in the message body with the processed content such that the forwarding of said signaling message comprises forwarding said processed content in said signaling message.

20. A method comprising:

responding, by a service control entity, to a detection of at least one predetermined condition occurring in a network, by issuing a first request to a call control entity for information concerning a content carried in a message body of a signaling message received by said call control entity;

analyzing said information concerning the content carried in the message body;

dependent on the result of said analyzing, issuing a second request to said control entity to send at least a part of said content of said signaling message to said service control entity; and processing, by said service control entity, said at least a part of said content of said signaling message; and sending, by said service control entity, the processed content to the call control entity and requesting the call control entity to deliver said processed content, where said processed content is sent via a data link different from a data link used for a call.

21. The method according to claim 20, further comprising:

processing said content sent from said call control entity to said service control entity.

22. The method according to claim 21, wherein said processing comprises modifying said content of, to delete said content of or to add a new content to the signaling message body.

23. The method according to claim 22, further comprising:

sending the processed content to the call control entity; and issuing a request to the call control entity to deliver said processed content.

* * * * *